United States Patent [19]

Bujalski et al.

[11] Patent Number: 4,889,899

[45] Date of Patent: Dec. 26, 1989

[54] METHOD OF PRODUCING SILICON CARBIDE PRECERAMIC VINYL-CONTAINING POLYMERS

[75] Inventors: Duane R. Bujalski, Bay City; Gary E. Le Grow; Jonathan Lipowitz, both of Midland, all of Mich.; Thomas F. Lim, Solon, Ohio

[73] Assignee: Dow Corning Corporation, Midland, Mich.

[21] Appl. No.: 94,347

[22] Filed: Sep. 8, 1987

[51] Int. Cl.$^4$ .................... C08F 283/00; C08G 77/04
[52] U.S. Cl. .................................. 525/479; 528/10; 528/25; 528/33
[58] Field of Search ............................. 528/10, 25, 33; 525/479

[56] References Cited

U.S. PATENT DOCUMENTS

| | | |
|---|---|---|
| Re. 31,447 | 11/1983 | Baney et al. |
| 4,260,780 | 4/1981 | West |
| 4,298,559 | 11/1981 | Baney et al. |
| 4,310,651 | 1/1982 | Baney et al. |
| 4,314,956 | 1/1982 | Baney et al. |
| 4,546,163 | 9/1985 | Haluska |
| 4,595,472 | 6/1986 | Haluska |
| 4,639,501 | 1/1987 | Seyferth |

OTHER PUBLICATIONS

Baney et al; "Methylchloropolysilane & Derivatives Prepared from the Redistribution of Methylchlorodisilanes"; 1983, 2, 859; Organometallics.

West, et all; "Polysilane High Polymers as Precursors to Silicon Carbide"; (1984), 25, 4; Polym. Prepr.

Primary Examiner—Edward A. Miller
Attorney, Agent, or Firm—James E. Bittell

[57] ABSTRACT

A method is described to prepare preceramic polysilanes which contain at least one weight percent vinyl. To ensure the survival of the vinyl groups in the polysilane the reaction and process conditions must be carefully controlled. The vinyl-containing polysilanes can be formed into fibers, cured either thermally or by UV irradiation, and then pyrolyzed to form ceramic fibers. Thermal curing and pyrolysis can be combined into a single process step.

50 Claims, No Drawings

METHOD OF PRODUCING SILICON CARBIDE PRECERAMIC VINYL-CONTAINING POLYMERS

STATEMENT OF GOVERNMENT RIGHTS

The United States Government has rights in this invention pursuant to Contract Number F33615-83-C-5006 awarded by the United States Air Force.

BACKGROUND OF THE INVENTION

This invention relates to vinyl-containing polysilanes of the general formula

[RSi][R$_2$Si]

where there are present 0 to 60 mole percent of [R$_2$Si] units and 40 to 100 mole percent of [RSi] units and vinyl-containing polysilanes of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units, where R is an alkyl radical containing 1 to 8 carbon atoms, where R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and vinyl groups. These vinyl-containing polysilanes are prepared by reacting a polysilane of general formula

[RSi][R$_2$Si]

where there are present 0 to 60 mole percent [RSi] units and 40 to 100 mole percent [R$_2$Si] units or a polysilane of general formula

[RSi][R$_2$Si][R"Si]

where there are present 0 to 40 mole percent [R$^2$Si] units, 0.1 to 99.9 mole percent [RSi] units, and 0.1 to 99.9 mole percent [R"Si] units and where the remaining bonds on silicon are attached to other silicon atoms and bromine or chlorine atoms, with a vinyl-containing Grignard reagent or vinyllithium under carefully controlled reaction and process conditions. The reaction conditions must be carefully controlled to ensure that the vinyl groups, which are incorporated into the polysilane via a derivatization reaction, survive the reaction and processing steps intact.

This invention also relates to a method of preparing such polysilanes under carefully controlled conditions to ensure the vinyl groups survive the reaction process. This invention further relates to the silicon carbide ceramics prepared from such vinyl-containing polysilanes. The vinyl-containing polysilanes of this invention may be rendered infusible thermally under an inert atmosphere or by exposure to UV irradiation in an inert atmosphere prior to pyrolysis to form ceramic material. Such cure mechanisms can result in ceramic materials containing only limited amounts of oxygen. Thermally curing the vinyl-containing polysilane is especially preferred because the actual curing can take place during the pyrolysis step to form a ceramic material. The vinyl-containing polysilanes of this invention can also be cured in oxygen-containing atmospheres but the resulting ceramic material obtained from such air cured polymers will contain increased amounts of oxygen.

Haluska in U.S. Pat. Nos. 4,546,163 (issued October 8, 1985) and 4,595,472 (issued June 17, 1986) claimed to produce vinyl-containing polysilanes by a redistribution mechanism by reacting various disilanes and vinyl-containing silanes in the presence of a redistribution catalyst. More careful work has now determined that the vinyl group itself is not incorporated into the resulting polysilane under the reaction conditions employed. The polysilanes of Haluska from the redistribution reaction of disilanes and vinyl silanes do not contain vinyl groups. This is illustrated in the Comparative Example 1 infra.

Haluska, in the just mentioned patents, also claimed that the vinyl content of his "vinyl-containing" polysilanes could be increased by reacting the "vinyl-containing" polysilane with a vinyl Grignard reagent or vinyllithium. However, it has now been determined that under the conditions Haluska employed during isolation of the end product (i.e. temperatures between 200° and 250° C. for time periods longer than a few minutes) that the vinyl groups will not survive. This is illustrated in Comparative Example 2 infra.

Based on these observations, it is clear that the alleged "vinyl-containing" polysilanes of U.S. Pat. Nos. 4,546,163 and 4,595,472 do not contain vinyl groups. In the examples of both patents, the vinyl content was merely calculated based on the initial reactants and the analyzed byproducts using the assumption that any unaccounted vinyl groups must have been incorporated into the polymer. The vinyl content was not determined experimentally. As indicated in the Comparative Example 1 infra, NMR analysis confirms the absence of vinyl groups in polysilanes prepared by the Haluska method.

This present invention differs from that of Haluska in that the reaction and process conditions under which a chlorine or bromine endblocked polysilane and a vinyl Grignard reagent or vinyllithium are reacted are carefully controlled to ensure the survival of the vinyl groups in the resulting polysilane. The present invention results in vinyl-containing polysilanes which are useful in preparing ceramic materials. The polysilanes of Haluska lack the desired vinyl groups. The presence of vinyl groups in the polysilanes of the present invention are confirmed by NMR analysis.

Baney et al. in U.S. Pat. No. 4,310,651 (issued January 12, 1982) disclosed a polysilane of general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to other silicon atoms and chlorine atoms or bromine atoms. The polysilane was converted to a beta-silicon carbide containing ceramic at elevated temperatures (about 1400° C.). The polysilanes of U.S. Pat. No. 4,310,651 generally are difficult to handle due to their high reactivity in air.

Baney et al. in U.S. Pat. No. 4,298,559 (issued November 3, 1981) prepared polysilanes of general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to other silicon atoms and additional alkyl radicals of 1 to 4 carbon atoms or phenyl radicals. Upon heating these polysilanes were converted into silicon carbide containing ceramics in high yields.

Baney et al. in U.S. Reissue Pat. No. Re. 31,447 (reissued November 22, 1983) disclosed polysilanes of the general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to other silicon atoms and alkoxy radicals containing 1 to 4 carbon atoms or phenoxy radicals. Silicon carbide ceramics were obtained by firing these polysilanes to elevated temperatures.

Baney et al. in U.S. Pat. No. 4,314,956 (issued Feb. 9, 1982) disclosed polysilanes of the general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to silicon and amine radicals of the general formula —NHR$^{iv}$ where R$^{iv}$ is a hydrogen atom, an alkyl radical of 1 to 4 carbon atoms or a phenyl radical. A silicon carbide ceramic was obtained by firing this polysilane to an elevated temperature under an inert atmosphere or under an ammonia atmosphere.

The just discussed U.S. Pat. Nos. 4,310,651, 4,298,599, Re 31,447, and 4,314,956 are hereby incorporated by reference. These polysilanes are further discussed in Baney et al. *Organometallics*, 2, 859 (1983).

West in U.S. Pat. No. 4,260,780 (issued Apr. 7, 1981) prepared a polysilane of general formula

[(CH$_3$)$_2$Si][CH$_3$(C$_6$H$_5$)Si]

by the sodium metal reduction of dimethyldichlorosilane and methylphenyldichlorosilane. The resulting polysilanes had very high softening points (>280° C.).

West et al. in *Polym. Prepr.*, 25, 4 (1984) disclosed the preparation of a polysilane of general formula

[CH$_3$(CH$_2$=CHCH$_2$)Si][CH$_3$(C$_6$H$_5$)Si]

by the sodium metal reduction of allylmethyldichlorosilane and methylphenyldichlorosilane. These polysilanes were rapidly gelled with ultraviolet irradiation.

Seyferth et al. in U.S. Pat. No. 4,639,501 (issued January 27, 1987) prepared preceramic polymers by reacting a methylpolysilane of the general formula [(RSiH)$_x$(RSi)$_y$]$_n$ with an organosilicon compound having at least two vinyl groups of the general formula [R$_2$(CH$_2$=CH)Si]$_2$Y, where, for example, Y is O, S, NH, NR, or is absent, using either UV irradiation, thermal energy, or catalysts.

It has now been determined that polysilanes of the general formula

[RSi][R$_2$Si]

which contain vinyl groups and polysilanes of the general formula

[RSi][R$_2$Si][R"Si]

which contain vinyl groups may be prepared in good yield. The presence of vinyl groups in the polysilanes is confirmed experimentally. These polysilanes may be pyrolyzed at elevated temperatures in an inert atmosphere to produce silicon carbide-containing ceramics. The polysilanes may be cured, and thus rendered infusible, prior to pyrolysis either thermally or by exposure to ultraviolet irradiation. The thermal cure step may be incorporated into the pyrolysis reaction thereby eliminating a separate cure step.

THE INVENTION

This invention relates to a method of preparing a first polysilane, containing at least one weight percent vinyl, having the general formula

[RSi][R$_2$Si]

where there are present 0 to 60 mole percent [R$_2$Si] units and 40 to 100 mole percent [RSi] units or having the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and vinyl groups, said method consisting of reacting under anhydrous conditions in the presence of a solvent a second polysilane of general formula

[RSi][R$_2$Si]

where there are present 0 to 60 mole percent [R$_2$Si] units and 40 to 100 mole percent [RSi] units or of general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with a vinyl Grignard reagent or vinyllithium at a temperature of 0° to 120° C. and thereafter removing the solvent at a temperature of less than about 200° C. to obtain the vinyl-containing first polysilane.

This invention also relates to a method of preparing a first polysilane, containing at least one weight percent vinyl, having the general formula

[RSi][R$_2$Si]

where there are present 0 to 60 mole percent [R$_2$Si] units and 40 to 100 mole percent [RSi] units or having the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms, vinyl groups, and R' radicals where R' is an alkyl radical containing 1 to 8 carbon atoms or phenyl radical, said method consisting of reacting under anhydrous conditions in the presence of a solvent a second polysilane of general formula

[RSi][R$_2$Si]

where there are present 0 to 60 mole percent [R$_2$Si] units and 40 to 100 mole percent [RSi] units or of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with a mixture selected from the group consisting of (1) a vinyl Grignard reagent and an organo Grignard reagent of general formula R'MgX', (2) a vinyl Grignard reagent and an organolithium compound of general formula R'Li, (3) vinyllithium and organo Grignard reagent of general formula R'MgX', and (4) vinyllithium and an organolithium compound of general formula R'Li where in the mixture R' is an alkyl radical containing 1 to 8 carbon atoms or a phenyl radical and X' is chlorine, bromine, or iodine, at a temperature of 0° to 120° C. and thereafter removing the solvent at a temperature of less than about 200° C. to obtain the vinyl-containing first polysilane.

This invention also relates to a method of preparing a silicon carbide-containing ceramic article, said method comprising (A) forming an article of the desired shape from a polysilane, containing at least one percent vinyl, of the general formula

[RSi][R$_2$Si]

in which polysilane there are from 0 to 60 mole percent [R$_2$Si] units and 40 to 100 mole percent [RSi] units or of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and vinyl groups; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to a silicon carbide-containing ceramic article.

This invention also relates to a method of preparing a silicon carbide-containing ceramic article, said method comprising (A) forming an article of the desired shape from a polysilane, containing at least one weight percent vinyl, of the general formula

[RSi][R$_2$Si]

in which polysilane there are from 0 to 60 mole percent [R$_2$Si] units and 40 to 100 mole percent [RSi] units, or of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$- where A is a hydrogen atom or an alkyl radical containing 1 to 4 carbon atoms, y is an integer equal to 0 to 3, X is chlorine or bromine, and z is an integer greater than or equal to 1 and where the remaining bonds on silicon are attached to other silicon atoms, vinyl groups, and R' groups where R' is an alkyl radical containing 1 to 8 carbon atoms or a phenyl radical; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to a silicon carbide-containing ceramic article.

The chlorine- or bromine-endblocked polysilane starting materials useful for preparing the vinyl-containing polysilanes of this invention may be prepared by reacting a mixture of one or more chlorine- or bromine-containing disilanes with about 0.1 to 10 weight percent of a catalyst at a temperature of about 100° to 340° C. while distilling byproduced volatile materials. This polysilane is of general formula

[RSi][R$_2$Si]

which contains 0 to 60 mole percent of [R$_2$Si] units and 40 to 100 mole percent of [RSi] units where R is an alkyl radical containing 1 to 8 carbon atoms and where the remaining bonds on silicon are attached to other silicon atoms and bromine or chlorine atoms. A preferred polysilane starting material is of general formula

[CH₃Si][(CH₃)₂Si]

which contains 0 to 60 mole percent of [(CH₃)₂Si] units and 40 to 100 mole percent of [CH₃Si] units and where the remaining bonds on silicon are attached to other silicon atoms and chlorine atoms. The procedures of preparing such polysilanes are well known in the art.

The chlorine- or bromine-containing disilanes useful in preparing the chlorine- or bromine-endblocked polysilanes are of the average formula

[R$_c$X$_d$Si]$_2$ where R is an alkyl radical containing from 1 to 8 carbon atoms, c has a value of 0 to 2.5, d has a value of 0.5 to 3, the sum (c+d) equals three, and X is chlorine or bromine. R in the above disilane may be methyl, ethyl, propyl, butyl, pentyl, hexyl, heptyl, and octyl. It is generally preferred that R is an alkyl radical containing 1 to 4 carbon atoms; it is most preferred that R is a methyl radical. The R radicals are not required to be the same. For example, the majority of the R radicals could be methyl radicals with the remainder being n-octyl radicals. The disilanes may be either symmetrical or non-symmetrical. Examples of suitable disilanes include (CH₃)₂ClSiSiCl(CH₃)₂, CH₃Cl₂SiSiCl(CH₃)₂, CH₃Cl₂SiSiCl₂CH₃, (CH₃)₂BrSiSiBr(CH₃)₂, CH₃Br₂SiSiBr(CH₃)₂, CH₃Br₂SiSiBr₂CH₃ and the like. Preferably in the above disilane X is chlorine. The disilane can be prepared from the appropriate silanes or the disilane can be utilized as it is found as a component of the process residue from the direct synthesis of organochlorosilanes. The direct synthesis of organochlorosilanes involves passing the vapor of an organic chloride over heated silicon and a catalyst. See Eaborn, "Organosilicon Compounds," Butterworths Scientific Publications, 1960, page 1. The disilane CH₃Cl₂SiSiCl(CH₃)₂ is found in large quantities in the residue from the reaction and therefore, this Direct Process Residue (DPR) is a good starting material for obtaining the polysilane polymer used in this invention.

Monosilanes may be added to the mixture of disilanes used to prepare the polysilanes useful in this invention. Suitable monoorganosilanes are of formula R″SiX₃ where R″ is selected from the group consisting of alkyl radicals of at least six carbon atoms, phenyl radicals, and radicals of the formula A$_y$X$_{(3-y)}$Si(CH₂)$_z$- where A is a hydrogen atom or an alkyl radical containing 1 to 4 carbon atoms, y is an integer equal to 0 to 3, X is chlorine or bromine, and z is an integer greater than or equal to 1. The A radicals in the formula A$_y$X$_{(3-y)}$Si(CH₂)$_z$- may be the same or different. Preferably, z is an integer from 1 to 10 and, most preferably, z is an integer equal to 1, 2 or 3. Examples of suitable monoorganosilanes include phenyltrichlorosilane, n-hexyltrichlorosilane, n-octyltrichlorosilane, phenyltribromosilane, n-octyltribromosilane, Cl₃SiCH₂CH₂SiCl₃, CH₃Cl₂SiCH₂CH₂SiCl₃, (CH₃)₂ClSiCH₂CH₂SiCl₃, H(CH₃)₂SiCH₂CH₂SiCl₃, and the like. Phenyltrichlorosilane and n-octyltrichlorosilane are the preferred monoorganosilanes. The use of such monosilanes are described in more detail in copending U.S. patent application Ser. No. 945,126 filed Dec. 22, 1986 and which is hereby incorporated by reference. Using monosilanes in the disilane mixture results in polysilanes of the general formula

[R₂Si][RSi][R″Si]

where R is an alkyl radical containing 1 to 8 carbon atoms and R″ is selected from the group consisting of alkyl radicals of at least six carbon atoms, phenyl radicals, and radicals of the formula A$_y$X$_{(3-y)}$Si(CH₂)$_z$- where A is a hydrogen atom or an alkyl radical containing 1 to 4 carbon atoms, y is an integer equal to 0 to 3, X is chlorine or bromine, and z is an integer greater than or equal to 1, and there are from 0 to 40 mole percent [R₂Si] units, 0.1 to 99.9 mole percent [RSi] units, and 0.1 to 99.9 mole percent [R″Si] units and wherein the remaining bonds on silicon are attached to other silicon atoms and chlorine atoms or bromine atoms. Preferably these polysilanes contain from 0 to 40 mole percent [R₂Si] units, 40 to 99 mole percent [RSi] units, and 1 to 30 mole percent [R″Si] units. Most preferably these polysilanes contain from 0 to 10 mole percent [R₂Si] units, 80 to 99 mole percent [RSi] units, and 1 to 20 mole percent [R″Si] units. The chlorine-containing polysilanes are preferred in the practice of this invention.

In order to prepare the starting chlorine or bromine endblocked polysilane, the chlorine- or bromine-containing disilanes are reacted in the presence of a rearrangement catalyst. Suitable rearrangement catalysts include ammonium halides, tertiary organic amines, tertiary organic phosphines, quaternary ammonium halides, quaternary phosphonium halides, hexamethylphosphoramide, and silver cyanide. Preferred catalyst includes quaternary ammonium halides having the formula R‴₄NX, quaternary phosphonium halides having the formula R‴₄PX, and hexamethylphosphoramide where R‴ is an alkyl radical containing 1 to 6 carbon atoms or a phenyl radical and X is chlorine or bromine.

The amount of catalyst utilized can range from 0.001 to 10 weight percent and preferably from 0.1 to 10 weight percent based on the weight of the starting disilane. The catalysts and starting materials require anhydrous conditions and therefore one must take care to insure that moisture is excluded from the reaction system when the disilanes and catalyst are mixed. Generally this can be done by using a stream of dry nitrogen or argon as a cover over the reaction mixture.

The disilane or mixture of disilanes are reacted in the presence of a rearrangement catalyst at a temperature of 100° to 340° C. while distilling byproduced volatile materials until there is produced the chlorine- or bromine-containing starting material polysilane of this invention. The order of mixing the reactants is not critical. Preferably the reaction temperature is from 150° to 250° C. Typically the reaction is carried out for about 1 to 48 hours although other time durations may be employed.

Typically the chlorine- or bromine-endblocked polysilane will contain from about 10 to 38 weight percent hydrolyzable chlorine or about 21 to 58 weight percent hydrolyzable bromine where the percentages are based on the weight of the polysilane.

As has been described in the prior art, these chlorine- or bromine-endblocked polysilanes may be pyrolyzed in an inert atmosphere or in a vacuum to obtain a silicon carbide ceramic material. However, the reactivity of the chlorine or bromine endblocking groups makes the handling of these polysilanes difficult. These polysilanes are especially difficult to handle when a low oxygen containing ceramic material is desired. Therefore it is preferred that the chlorine or bromine endblocking groups be replaced with vinyl endblocking groups. The vinyl endblocking groups also allow for thermal curing of the polysilane either before or during pyrolysis to form ceramic materials.

The vinyl-containing polysilanes of this invention must contain at least one percent vinyl. It is generally preferred that the polysilanes contain about 2 to 5 weight percent vinyl. As noted earlier, the vinyl groups are thermally sensitive. Therefore, the vinyl-containing polysilane processing conditions must be carefully controlled so that the vinyl content does not fall below the minimum one weight percent. Generally, the temperature of the polysilane should be kept below about 200° C., and preferably below about 160° C. Temperatures up to 220° C. can be tolerated for some specific vinyl-containing polysilanes if the exposure time is sufficiently short (generally a matter of only a few minutes). But it is generally preferred that such high temperatures are avoided. The thermal degradation of the vinyl-containing polysilanes of this invention depends in large part on the temperature to which the polysilane is exposed as well as the time duration of the thermal exposure. Generally, the higher the temperature, the shorter the exposure time must be to ensure that the polysilane contains the minimum required vinyl content. It is not possible to more closely define the time/temperature parameters required to ensure the desired vinyl-content. Such parameters will depend on the specific polysilane, the size and shape of the article, and other variables; such parameters can, however, be determined experimentally for a specific application.

One vinyl-containing polysilane may be prepared by reacting the chlorine- or bromine-endblocked polysilane, under anhydrous conditions, with a vinyl Grignard reagent of general formula $(CH_2=CH)MgX'$ or with vinyllithium where $X'$ is chlorine, bromine, or iodine.

The vinyl Grignard reagents useful in this invention are well known in the art. Typical Grignard reaction solvents can be used herein. Preferred are alkyl ethers and tetrahydrofuran.

Vinyllithium is also well known in the art. Suitable solvents include toluene, xylene, benzene, tetrahydrofuran, and ethers.

Combinations of vinyl Grignard reagents and vinyllithium may also be used. Additionally, other Grignard reagents and/or organolithium compounds may also be used in combination with the vinyl Grignard reagent or vinyllithium. Suitable non-vinyl-containing Grignard reagents are of the general formula $R'MgX'$ where $R'$ is an alkyl radical of 1 to 8 carbon atoms or a phenyl radical and $X'$ is chlorine, bromine, or iodine. Suitable non-vinyl-containing organolithium compounds are of the general formula $R'Li$ where $R'$ is an alkyl radical of 1 to 8 carbon atoms or a phenyl radical. One preferred reactant mixture contains vinyl Grignard reagent and methyl Grignard reagent. When such a mixture is employed it is generally preferred that the vinyl/methyl molar ratio of the mixture be less than about 2.0, more preferably less than about 1.5, and most preferably less than about 1.0. It is also possible to first react the polysilane with a vinyl Grignard reagent or vinyl lithium and then react the resulting polysilane with a non-vinyl Grignard reagent or a non-vinyl lithium compound; for purposes of this invention, such addition methods are still considered to be reactant mixtures.

For best results, dry reaction conditions should be observed. Solvents for the starting chlorine- or bromine-endblocked polysilane can be any organic solvent in which the material is soluble and which does not react with the material except in the desired manner. Examples of useful solvents include toluene, xylene, benzene, tetrahydrofuran, and ethers. Specifically, toluene is preferred. Generally it has been found preferable to add the chlorine- or bromine-endblocked polysilane to an excess of vinyl Grignard reagent or vinyllithium compound, both in a solvent solution. Where a mixture of a vinyl Grignard reagent and a non-vinyl Grignard reagent is employed, it is also generally preferred to add the chlorine- or bromine-endblocked polysilane to an excess of the Grignard reagent mixture. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the mixture is stirred for a time, with or without heating, to ensure the completion of the reaction. Typically the reaction is carried out for a time period of about 1 to 48 hours. Excess Grignard reagent or organolithium compound is then destroyed using water, HCl, or an alcohol. The reaction mixture is cooled to room temperature and then filtered by conventional means and the solvents and other volatile materials are then removed by stripping under vacuum at temperatures less than about 200° C. and preferably less than about 160° C. Care must be taken to keep the reaction and process temperature below about 200° C. and preferably below about 160° C. throughout the process; otherwise the vinyl content of the resulting polysilane will be substantially reduced or perhaps eliminated entirely.

It is not necessary to remove all the solvent. Sufficient solvent may be removed to increase the viscosity of the polysilane solution to such levels suitable for dry spinning if fibers are desired. More solvent can be removed if desired; but the temperature during solvent removal should not exceed about 200° C. and preferably not exceed about 160° C. Where most of the solvent is removed the resulting polysilanes are generally solids. The vinyl-containing polysilanes may still contain some chlorine or bromine but the content of the chlorine or bromine groups is substantially reduced relative to that of the starting chlorine- or bromine-endblocked polysilane.

The vinyl-containing polysilanes of this invention may be fired in an inert atmosphere or in a vacuum to an elevated temperature of at least 800° C. until a silicon carbide ceramic material is obtained. Preferably the pyrolysis temperature is 1000° C. or higher. Most preferably the pyrolysis temperature is 1200° to 1500° C.

The vinyl-containing polysilanes may be formed into shaped articles prior to pyrolysis. Fibers are one especially preferred shaped article. As noted above, the vinyl-containing polysilanes of this invention are thermally sensitive. The polysilane will thermally degrade (by which we mean loss of vinyl groups and increased crosslinking) if stored even at room temperature under an inert atmosphere for an extended time (i.e. several months). It is generally more difficult to prepare fibers from polysilane material which has been stored several months at room temperature. It is thus preferred that where fibers or other shaped articles are desired that the shaped article be formed from freshly prepared polysilane or from polysilane which is less than a week old. Thermal degradation can be minimized, of course, by storage at temperature below room temperature under an inert atmosphere.

The vinyl-containing polysilanes of this invention may be cured, and thereby rendered infusible, prior to pyrolysis. The curing may be accomplished by heating the polysilane to a temperature of about 250° C. During this curing step the temperature should be raised at a sufficiently slow rate so that the shaped article will not melt or fuse. Generally the temperature rate will not be overly critical because the estimated softening point of these vinyl-containing polysilanes is above the actual curing temperature. Based on similar, but non-vinyl-containing polysilanes, the softening temperature is expected to be about 200° C.; but the vinyl-based curing mechanism appears to become significant above about 150° C. Thus these vinyl-containing polysilanes generally will be rendered infusible before the softening point will be reached. Thermal curing can be carried out in either an inert or oxygen-containing atmosphere. Curing by heat in an oxygen-containing atmosphere will result in significant oxygen content in the resulting ceramic material. Therefore it is preferred that the vinyl-containing polysilanes of this invention be cured in an inert atmosphere.

The vinyl-containing polysilanes of this invention may also be cured by exposure to ultraviolet (UV) irradiation prior to pyrolysis. The vinyl-containing polysilanes of this invention have a maximum UV absorption in the 200 to 245 nm range. Toluene solubility may be used as a screening test for a determination of dosage and UV exposure times required. The uncured polysilane is soluble in toluene whereas the cured, infusible polysilane is insoluble or mostly insoluble in toluene. Even if the shaped article is not rendered completely infusible during the UV curing step, the curing can be completed during the pyrolysis step if the starting temperature is below about 200° C. The polysilanes of this invention may be cured by UV irradiation either in an inert atmosphere or in air. If a ceramic material with reduced oxygen content is desired then curing by UV irradiation in an inert atmosphere is obviously preferred. Because of the ability of the vinyl-containing polysilanes to be cured thermally in an inert atmosphere, the use of UV curing is of limited practical usefulness. But UV curing might be useful where it is desired or necessary to store the formed articles for extended times prior to the final pyrolysis step. Other situations where UV curing might be desirable may suggest themselves to those skilled in the art.

The preferred curing method is thermal curing under an inert atmosphere. Such a curing step may be independent of the pyrolysis step or it may be incorporated into the pyrolysis step. The vinyl-containing polysilanes of this invention allow for the formation of a shaped article followed by a single curing and pyrolysis step to yield a ceramic article. This represents a significant advance over the prior art.

The vinyl-containing polysilanes of this invention may also be used as binders or infiltrates to produce ceramic materials or ceramic-containing materials such as composites. Other uses will be apparent to those skilled in the art.

The following examples are intended to illustrate the invention and not to limit the invention.

In the following examples, the analytical methods used were as follows:

Percent chlorine was determined by fusion with sodium peroxide and potentiometric titration with silver nitrate.

The softening temperature was determined on a Thermomechanical Analyzer, Model 1090, from DuPont Instruments.

Carbon, hydrogen, and nitrogen were determined on a C, H, N Elemental Analyzer, Model 240-XA, manufactured by Control Equipment Corporation of Lowell, Massachusetts.

Oxygen was determined using a Leco Oxygen Analyzer equipped with an Oxygen Determinater 316 (Model 783700) and an Electrode Furnace EF100 (Model 77600) manufactured by Leco Corporation, St. Joseph, Michigan. The method includes the high temperature carbothermic reduction to CO with CO analysis by IR.

Thermogravimetric analyses (TGA) were carried out on an OmniTherm TGA instrument manufactured by OmniTherm Corporation, Arlington Heights, Illinois.

NMR spectra were recorded on a Model EM-390 NMR spectrometer from Varian Associates of Palo Alto, California.

The polysilanes were fired to elevated temperature using an Astro Industries Furnace 1000A (water cooled graphite heated model 1000.3060-FP-12) or a Lindberg furnace (model 54434).

Percent silicon was determined by a fusion technique which consisted of converting the silicon material to soluble forms of silicon and then analyzing the soluble material quantitatively for total silicon by atomic absorption spectrometry.

COMPARATIVE EXAMPLE 1

A mixture of 414.0 g (1.9 moles) methylchlorodisilanes, 21.8 g (0.107 moles) phenylvinyldichlorosilane, and 4.4 g (0.015 moles) tetra-n-butylphosphonium bromide catalyst were reacted under argon using the basic procedure used in U.S. Pat. No. 4,595,472. The methylchlorodisilane used was redistilled direct process residue which contained about 50 weight percent $CH_3Cl_2SiSiCl_2CH_3$, 36 weight percent $(CH_3)_2ClSiSiCl_2CH_3$, 12 weight percent $(CH_3)_2ClSiSiCl(CH_3)_2$, and 2 weight percent low boiling silanes. The catalyst was from Alfa Products, Danvers, Mass. The reaction mixture was heated from room temperature to 100° C. at 5° C./min, 100° to 110° C. at 2° C./min, held at 110° C. for 17 minutes, 110° to 120° C. at 2° C./min, and 120° to 250° C. at 3° C./min. Throughout the heating process volatile byproducts were distilled from the reaction mixture and collected. Both the reaction mixture and the byproducts were sampled throughout the reaction for NMR and GC analysis. The following results were obtained: the reaction mixture at 50° C. had a vinyl/phenyl molar ratio of 0.91 by NMR; at 100° C. the vinyl/phenyl molar ratio was 0.88; at 110° C. the vinyl/phenyl molar ratio was 0.86; at 150° C. the vinyl/phenyl molar ratio was 0.90; at 200° C. the vinyl/phenyl molar ratio was 0.73 and the volatile material contained methylchlorodisilanes and phenylvinyldichlorosilane; at 250° C. the total reaction mixture had a vinyl/phenyl molar ratio of 0.11, the liquid portion of the reaction mixture (about 5 percent of the total reaction mixture) had a vinyl/phenyl molar ratio of 0.40, and the liquid portion contained methylchlorodisilanes and 1.4 weight percent phenylvinyldichlorosilane; and the total distillate contained dimethyldichlorosilane, methyldichlorosilane, and methylchlorodisilanes. Up to 150° C. the vinyl/phenyl molar ratio was approximately constant at about 0.9. The loss of vinyl groups, as indicated by the reduction in the vinyl/phenyl ratio, began between 150° and 200° C. At 250° C. very little of the vinyl remained; from the GC analysis it appears that most of the remaining vinyl is in unreacted phenylvinyldichlorosilane and not in the polysilane. Therefore, it is clear that vinyl groups are not incorporated into the polysilane as claimed by Haluska in U.S. Pat. Nos. 4,546,163 and 4,595,472.

COMPARATIVE EXAMPLE 2

Several polysilanes were prepared and reacted with a mixture of methyl and vinyl Grignard reagents as in Example 1 except that the relative amounts of methyl and vinyl Grignard reagents were varied. Run (A) employed 0.118 moles of $CH_3MgCl$ and 0.479 moles $(CH_2=CH)MgBr$ with a vinyl/methyl molar ratio of 4.1; run (B) employed 0.181 moles $CH_3MgCl$ and 0.420 moles $(CH_2=CH)MgBr$ with a vinyl/methyl molar ratio of 2.3; and run (C) employed 0.224 moles $CH_3MgCl$ and 0.339 moles $(CH_2=CH)MgBr$ with a vinyl/methyl molar ratio of 1.5. The solvent was removed in the same manner as in Example 1 except that the final stripping conditions were varied as follows: for run (A), the polysilane was stripped at 220° C. for two minutes at 70 mm Hg; for run (B), the polysilane was stripped 180° C. for 12 minutes at 20 mm Hg; and for run (C), the polysilane was stripped at 200° C. for 14 minutes at 20 mm Hg. In each case the polymer gelled; the resulting products contained essentially no surviving vinyl groups. The polysilanes were not soluble in common organic solvents. Because of the insolubility of the gelled polysilanes the loss of vinyl groups could not be directly confirmed by NMR. This example demonstrates that excessive temperatures can cause the loss of vinyl groups. As can be seen by comparing this example with later examples, polysilanes with lower vinyl/methyl molar ratios can be exposed to relatively high temperatures without excessive loss of the vinyl groups.

EXAMPLE 1

A polysilane was prepared by reacting a mixture of 1182.8 g (5.4 moles) methylchlorodisilanes, 67.0 g (0.27 moles) n-octyltrichlorosilane, and 12.5 g (0.037 moles) tetra-n-butylphosphonium bromide catalyst under argon by heating the mixture to 250° C. while removing volatile byproducts using the basic procedure used in U.S. Pat. No. 4,595,472. The methylchlorodisilanes were the same as used in Comparative Example 1. The reaction mixture was heated to 110° C. at a rate of 5° C./min, held at 110° C. for about 30 minutes, and then heated from 110° to 250° C. at a rate of 2.0° C./min. A polysilane was obtained in 20.0 percent yield.

The polysilane (81.5 g, 0.46 moles chlorine) was dissolved in xylene (298 g) and cooled with a water/ice bath. A mixture of a methyl Grignard reagent, $CH_3MgCl$, (0.26 moles, 3.0M in tetrahydrofuran) and a vinyl Grignard reagent, $(CH_2=CH)MgBr$, (0.26 moles, 1.0M in tetrahydrofuran) was added dropwise over about 20 minutes to the polysilane solution under an argon atmosphere. The vinyl/methyl molar ratio in the Grignard mixture was 1.0. During the addition the temperature rose to about 27° C. The temperature was then raised to about 100° C. and held for 30 minutes. After cooling to room temperature, excess Grignard reagent was quenched with a saturated aqueous solution of $NH_4Cl$. The organic layer was collected and then dried with anhydrous $MgSO_4$ and filtered through a 0.2 micron filter. The solvent was removed by first distilling at atmospheric pressure and then a vacuum strip at 220° C. for five minutes at 20 mm Hg. A solid vinyl-containing polysilane was obtained which contained 38.5 percent silicon, 36.1 percent carbon, 8.32 percent hydrogen, 1.28 percent oxygen, 7.1 percent chlorine, and 2.5 percent vinyl. The presence of vinyl in the polysilane was directly confirmed by NMR analysis. The polysilane had a softening temperature of 50° C., a weight average molecular weight of 2106, and a number average molecular weight of 865. This example thus illustrates that the vinyl group may survive temperatures up to 220° C. if the vinyl/methyl molar ratio is sufficiently low and the thermal exposure is of short duration. A bulk polysilane sample was pyrolyzed to either 1000° C. (TGA analysis) or 1200° C.; the resulting ceramic material pyrolyzed to 1000° C. gave 67.2 percent ceramic yield; the resulting ceramic material pyrolyzed to 1200° C. contained 62.7 percent silicon, 28.3 percent carbon, undetected hydrogen, 1.06 percent oxygen, and 1.0 percent chlorine.

EXAMPLE 2

Several polysilanes were prepared and reacted with a mixture of methyl and vinyl Grignard reagents as in Example 1 except that the mixture of methyl and vinyl Grignard reagents contained 0.223 moles of $CH_3MgCl$ and 0.339 moles $(CH_2=CH)MgBr$ with a vinyl/methyl molar ratio of 1.5. The solvent was removed in the same manner as in Example 1 except that the final stripping conditions were varied as follows: for run (A), the polysilane was stripped at 160° C. for 20 minutes at 20 mm Hg; for run (B), the polysilane was stripped 170° C. for 20 minutes at 20 mm Hg; and for run (C), the polysilane was stripped at 160° C. for 20 minutes at 20 mm Hg. For run (A), a solid vinyl-containing polysilane was obtained which contained 38.3 percent silicon, 35.4 percent carbon, 7.36 percent hydrogen, 3.03 percent oxygen, 5.3 percent chlorine, and 2.3 percent vinyl. The polysilane had a softening temperature of 60° C., a weight average molecular weight of 2177, and a number average molecular weight of 785. For run (B), a solid vinyl-containing polysilane was obtained which contained 44.0 percent silicon, 37.8 percent carbon, 8.03 percent hydrogen, 2.60 percent oxygen, 4.6 percent chlorine, and 2.0 percent vinyl. The polysilane had a softening temperature of 74° C., a weight average molecular weight of 2638, and a number average molecular weight of 838. For run (C), a solid vinyl-containing polysilane was obtained which contained 43.9 percent silicon, 39.4 percent carbon, 8.31 percent hydrogen, 2.7 percent chlorine, and 4.0 percent vinyl (oxygen was not determined). The polysilane had a softening temperature of 49° C., a weight average molecular weight of 2989, and a number average molecular weight of 1309. NMR analysis confirmed the presence of vinyl groups in each of the polysilanes. The vinyl-containing polysilanes were soluble in toluene.

Bulk polysilane samples from each of the runs were pyrolyzed to 1000° C. (TGA analysis) or 1200° C. Ceramic yields are from 1000° C. pyrolysis; elemental analyses are from 1200° C. pyrolysis. The resulting ceramic material from run (A) (67.5 percent ceramic yield) contained 60.4 percent silicon, 30.9 percent carbon, 0.03 percent hydrogen, 1.67 percent oxygen, and 2.8 percent chlorine. The resulting ceramic material from run (B) (67.3 percent ceramic yield) contained 60.8 percent silicon, 26.4 percent carbon, 0.01 percent hydrogen, 1.86 percent oxygen, and 2.0 percent chlorine. The resulting ceramic material from run (C) (65.4 percent ceramic yield) contained 59.5 percent silicon, 32.2 percent carbon, undetected hydrogen, 1.45 percent oxygen, and 5.9 percent chlorine.

EXAMPLE 3

A polysilane was prepared by reacting a mixture of 744.3 g (3.4 moles) methylchlorodisilanes, 42.2 g (0.17 moles) n-octyltrichlorosilane, and 7.9 g (0.023 moles) tetra-n-butylphosphonium bromide catalyst under argon by heating the mixture to 195° C. while removing volatile byproducts using the basic procedure used in U.S. Pat. No. 4,595,472. The methylchlorodisilanes were the same as used in Comparative Example 1. The reaction mixture was heated to 108° C. at a rate of 5° C./min, held at 108° C. for about 30 minutes, and then heated from 108° to 195° C. at a rate of 1.5° C./min. A polysilane was obtained in 22.6 percent yield.

The polysilane (129.7 g) was dissolved in toluene (503 g) and cooled with a water/ice bath. Vinyl Grignard reagent, ($CH_2$=CH)MgBr, (1.0 mole, 1.0M in tetrahydrofuran) was added dropwise over about one hour to the polysilane solution under an argon atmosphere. During the addition the temperature rose to about 31° C. The temperature was then raised to about 100° C. and held for 30 minutes. Upon cooling to room temperature, a mixture of a methyl Grignard reagent, $CH_3MgCl$, (0.57 moles, 3.0M in tetrahydrofuran) and vinyl Grignard reagent, $CH_3MgCl$, (0.17 moles, 1.0M in tetrahydrofuran) was added over about five minutes. The overall vinyl/methyl molar ratio for the added Grignard reagents was 2.05. The temperature was raised to 100° C. and held for about one hour. After cooling to room temperature, excess Grignard reagent was quenched with a saturated aqueous solution of $NH_4Cl$. The organic layer was collected and then dried with anhydrous $MgSO_4$ and filtered through a 0.2 micron filter. The solvent was removed by first distilling at atmospheric pressure and then a vacuum strip at 175° C. for about 20 minutes at 20 mm Hg. A solid vinyl-containing polysilane (76.8 g) was obtained which contained 37.9 percent silicon, 48.3 percent carbon, 10.4 percent hydrogen, 1.0 percent oxygen, 1.5 percent chlorine, and 23.0 percent vinyl. The presence of vinyl in the polysilane was directly confirmed by NMR analysis. The polysilane had a softening temperature of 23° C., a weight average molecular weight of 3670, and a number average molecular weight of 713. The polysilane, when pyrolyzed to 1000° C. (TGA analysis) gave a ceramic product with a yield of 69.9 percent.

EXAMPLE 4

A polysilane was prepared by reacting a mixture of 436 g (2.0 moles) methylchlorodisilanes and 4.4 g (0.013 moles) tetra-n-butylphosphonium bromide catalyst under argon by heating the mixture to 250° C. while removing volatile byproducts using the basic procedure used in U.S. Pat. No. 4,595,472. The methylchlorodisilanes were the same as used in Comparative Example 1. The reaction mixture was heated to 110° C. at a rate of about 17° C./min and then heated from 110° to 250° C. at a rate of 2.0° C./min. A polysilane was obtained in 17.3 percent yield. The polysilane was a solid at room temperature.

The polysilane (75.4 g, 0.43 moles chlorine) was dissolved in 174 g of toluene. Vinyl Grignard reagent, ($CH_2$=CH)MgBr, (0.50 moles, 1.0M in tetrahydrofuran) was added over about 5 minutes to the polysilane solution under an argon atmosphere. During the addition the temperature rose to about 40° C. The temperature was then raised to about 100° C. and held for one hour. After cooling to room temperature, about 100 ml of toluene was added and the excess Grignard reagent was quenched with about 50 ml of a saturated aqueous solution of $NH_4Cl$. The organic layer was collected and then dried with anhydrous $MgSO_4$ and filtered through a 0.2 micron filter. The solvent was removed using a vacuum strip distillation at 140° C. for about 20 minutes at 30 mm Hg. The resulting polymer (about 36 g yield) was a viscous liquid. Fibers were obtained from this material using a dry spinning technique under a nitrogen atmosphere using toluene as solvent. The fibers were then pyrolyzed to 1200° C. at a rate of 3.0° C./min under nitrogen. The fibers did not melt or fuse during pyrolysis indicating that the polysilane fibers thermally cured during the initial portion of the pyrolysis step.

That which is claimed:

1. A method of preparing a first polysilane, containing at least one weight percent vinyl, having the general formula

[RSi][$R_2$Si]

where there are present 0 to 60 mole percent [$R_2$Si] units and 40 to 100 mole percent [RSi] units or having the general formula

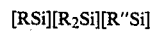

[RSi][$R_2$Si][R"Si]

where there are present 0 to 40 mole percent [$R_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and vinyl groups, said method consisting of reacting under anhydrous conditions in the presence of a solvent a second polysilane of general formula

[RSi][$R_2$Si]

where there are present 0 to 60 mole percent [$R_2$Si] units and 40 to 100 mole percent [RSi] units or of the general formula

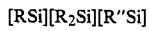

[RSi][$R_2$Si][R"Si]

where there are present 0 to 40 mole percent [$R_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with vinyl Grignard reagent or vinyllithium, at a temperature of 0° to 120° C. and thereafter removing the solvent at a temperature of less than about 200° C. to obtain the vinyl-containing first polysilane.

2. A method as defined in claim 1 wherein the remaining bonds on silicon in the second polysilane are attached to other silicon atoms and chlorine atoms; and where R in both the first and second polysilanes is a methyl group.

3. A method as defined in claim 2 where the solvent is removed at a temperature of less than 160° C.

4. A method as defined in claim 2 wherein the second polysilane is reacted with a vinyl Grignard reagent.

5. A method as defined in claim 4 where the solvent is removed at a temperature of less than 160° C.

6. A method as defined in claim 2 wherein the second polysilane is reacted with vinyllithium.

7. A method as defined in claim 6 where the solvent is removed at a temperature of less than 160° C.

8. A method as defined in claim 1 wherein the first polysilane and the second polysilane have the general formula

[RSi][R₂Si][R″Si]

where there are present 0 to 40 mole percent [R₂Si] units, 40 to 99 mole percent [RSi] units, and 1 to 30 mole percent [R″Si] units.

9. A method as defined in claim 8 where there is present in the first polysilane and the second polysilane 1 to 10 mole percent [R₂Si] units, 80 to 99 mole percent [RSi] units, and 1 to 20 mole percent [R″Si] units.

10. A method of preparing a first polysilane, containing at least one weight percent vinyl, having the general formula

[RSi][R₂Si]

where there are present 0 to 60 mole percent [R₂Si] units and 40 to 100 mole percent [RSi] units or having the general formula

[RSi][R₂Si][R″Si]

where there are present 0 to 40 mole percent [R₂Si] units, 0.1 to 99.9 mole percent [RSi] units, and 0.1 to 99.9 mole percent [R″Si] units where R is an alkyl radical containing 1 to 8 carbon atoms, R″ is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms, vinyl groups, and R′ radicals where R′ is an alkyl radical containing 1 to 8 carbon atoms or phenyl radical, said method consisting of reacting under anhydrous conditions in the presence of a solvent a second polysilane of general formula

[RSi][R₂Si]

where there are present 0 to 60 mole percent [R₂Si] units and 40 to 100 mole percent [RSi] units or of the general formula

[RSi][R₂Si][R″Si]

where there are present 0 to 40 mole percent [R₂Si] units, 0.1 to 99.9 mole percent [RSi] units, and 0.1 to 99.9 mole percent [R″Si] units where R is an alkyl radical containing 1 to 8 carbon atoms, R″ is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with a mixture selected from the group consisting of (1) a vinyl Grignard reagent and an organo Grignard reagent of general formula R′MgX′, (2) a vinyl Grignard reagent and an organolithium compound of general formula R′Li, (3) vinyllithium and organo Grignard reagent of general formula R′MgX′, and (4) vinyllithium and an organolithium compound of general formula R′Li where in the mixture R′ is an alkyl radical containing 1 to 8 carbon atoms or a phenyl radical and X′ is chlorine, bromine, or iodine, at a temperature of 0° to 120° C. and thereafter removing the solvent at a temperature of less than about 200° C. to obtain the vinyl-containing first polysilane.

11. A method as defined in claim 10 where the vinyl/R′ molar ratio in the mixture is less than about 2.0.

12. A method as defined in claim 11 where the vinyl/R′ molar ratio in the mixture is less than about 1.5.

13. A method as defined in claim 12 wherein the remaining bonds on silicon in the second polysilane are attached to other silicon atoms and chlorine atoms; where R in both the first and second polysilanes is a methyl group; and where R′ is a methyl group.

14. A method as defined in claim 13 where the solvent is removed at a temperature of less than 160° C.; and where the molar ratio of vinyl/methyl in the mixture is less than about 1.0.

15. A method as defined in claim 14 where the mixture contains a vinyl Grignard reagent and an organo Grignard reagent of general formula CH₃MgX′.

16. A method as defined in claim 14 where the mixture contains a vinyl Grignard reagent and methyllithium.

17. A method as defined in claim 14 where the mixture contains vinyllithium and organo Grignard reagent of general formula CH₃MgX′.

18. A method as defined in claim 14 where the mixture contains vinyllithium and methyllithium.

19. A method as defined in claim 10 where the first polysilane contains 2 to 5 weight percent vinyl.

20. A method as defined in claim 10 wherein the first polysilane and the second polysilane have the general formula

[RSi][R₂Si][R″Si]

where there are present 0 to 40 mole percent [R₂Si] units, 40 to 99 mole percent [RSi] units, and 1 to 30 mole percent [R″Si] units.

21. A method as defined in claim 20 where there is present in the first polysilane and the second polysilane 1 to 10 mole percent [R$_2$Si] units, 80 to 99 mole percent [RSi] units, and 1 to 20 mole percent [R"Si] units.

22. A first polysilane as prepared by the method of claim 1.

23. A first polysilane as prepared by the method of claim 3.

24. A first polysilane as prepared by the method of claim 5.

25. A first polysilane as prepared by the method of claim 9.

26. A first polysilane as prepared by the method of claim 10.

27. A first polysilane as prepared by the method of claim 14.

28. A first polysilane as prepared by the method of claim 15.

29. A first polysilane as prepared by the method of claim 19.

30. A first polysilane as prepared by the method of claim 20.

31. A method of preparing a silicon carbide-containing ceramic article, said method comprising (A) forming an article of the desired shape from a polysilane, containing at least one weight percent vinyl, of the general formula

[RSi][R$_2$Si]

in which polysilane there are from 0 to 60 mole percent [R$_2$Si] units and 40 to 100 mole percent [RSi] units or of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$— where A is a hydrogen atom or an alkyl radical containing 1 to 4 carbon atoms, y is an integer equal to 0 to 3, X is chlorine or bromine, and z is an integer greater than or equal to 1 and where the remaining bonds on silicon are attached to other silicon atoms and vinyl groups; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to a silicon carbide-containing ceramic article.

32. A method as defined in claim 31 where the article is cured in step (B) by heating the article to about 250° C. at a rate sufficiently slow so that the article does not melt or fuse during the curing step.

33. A method as defined in claim 32 where R in the polysilane is a methyl group; and where the curing step (B) is carried out under an inert atmosphere.

34. A method as defined in claim 33 wherein steps (B) and (C) are combined into a single step whereby the article of step (A) is thermally cured during the initial stages of the pyrolysis step (C).

35. A method as defined in claim 34 where the polysilane contains 2 to 5 weight percent vinyl.

36. A method as defined in claim 31 where the article is cured in step (B) by UV irradiation.

37. A method as defined in claim 31 where the polysilane is of the general formula

[RSi][R$_2$Si][R"Si]

where there are present 0 to 40 mole percent [R$_2$Si] units, 40 to 99 mole percent [RSi] units, and 1 to 30 mole percent [R"Si] units.

38. A method as defined in claim 37 where there is present in the polysilane 1 to 10 mole percent [R$_2$Si] units, 80 to 99 mole percent [RSi] units, and 1 to 20 mole percent [R"Si] units.

39. A method of preparing a silicon carbide-containing ceramic article, said method comprising (A) forming an article of the desired shape from a polysilane, containing at least one weight percent vinyl, of the general formula

[RSi][R$_2$Si]

in which polysilane there are from 0 to 60 mole percent [R$_2$Si] units and 40 to 100 mole percent [RSi] units, or of the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units where R is an alkyl radical containing 1 to 8 carbon atoms, R" is selected from the group consisting of alkyl radicals of at least six carbon atoms, phenyl radicals, and radicals of the formula A$_y$X$_{(3-y)}$Si(CH$_2$)$_z$— where A is a hydrogen atom or an alkyl radical containing 1 to 4 carbon atoms, y is an integer equal to 0 to 3, X is chlorine or bromine, and z is an integer greater than or equal to 1 and where the remaining bonds on silicon are attached to other silicon atoms, vinyl groups, and R' groups where R' is an alkyl radical containing 1 to 8 carbon atoms or a phenyl radical; (B) curing the article formed in step (A) so that the article will not melt or fuse during pyrolysis step (C); and (C) heating the cured article of step (B) in an inert atmosphere or in a vacuum to an elevated temperature greater than 800° C. until the polysilane is converted to a silicon carbide-containing ceramic article.

40. A method as defined in claim 39 where the article is cured in step (B) by heating the article to about 250° C. at a rate sufficiently slow so that the article does not melt or fuse during the curing step.

41. A method as defined in claim 40 where the vinyl/R' molar ratio is less than about 2.0 in the polysilane.

42. A method as defined in claim 41 where the vinyl/R' molar ratio is less than about 1.5 in the polysilane.

43. A method as defined in claim 42 where R and R' are both methyl groups; where the vinyl/R' molar ratio is less than about 1.0; and where the curing step (B) is carried out under an inert atmosphere.

44. A method as defined in claim 42 wherein steps (B) and (C) are combined into a single step whereby the article of step (A) is thermally cured during the initial stages of the pyrolysis step (C).

45. A method as defined in claim 43 wherein steps (B) and (C) are combined into a single step whereby the article of step (A) is thermally cured during the initial stages of the pyrolysis step (C).

46. A method as defined in claim 44 where the polysilane contains 2 to 5 weight percent vinyl.

47. A method as defined in claim 45 where the polysilane contains 2 to 5 weight percent vinyl.

48. A method as defined in claim 39 where the article is cured in step (B) by UV irradiation.

49. A method as defined in claim 39 where the polysilane is of the general formula

[RSi][R$_2$Si][R″Si]

where there are present 0 to 40 mole percent [R$_2$Si] units, 40 to 99 mole percent [RSi] units, and 1 to 30 mole percent [R″Si] units.

50. A method as defined in claim 49 where there is present in the polysilane 1 to 10 mole percent [R$_2$Si] units, 80 to 99 mole percent [RSi] units, and 1 to 20 mole percent [R″Si] units.

* * * * *

UNITED STATES PATENT AND TRADEMARK OFFICE
CERTIFICATE OF CORRECTION

PATENT NO. : 4,889,899

DATED : 12/26/89

INVENTOR(S) : Duane R. Bujalski, Gary E. LeGrow, Jonathan Lipowitz, Thomas F. Lim It is certified that error appears in the above-identified patent and that said Letters Patent is hereby corrected as shown below:

Cols. 19-22

Delete Claims 31 to 50.

Signed and Sealed this

Twenty-first Day of May, 1991

Attest:

HARRY F. MANBECK, JR.

Attesting Officer

Commissioner of Patents and Trademarks